US011692519B2

(12) United States Patent
Jedlinski et al.

(10) Patent No.: US 11,692,519 B2
(45) Date of Patent: Jul. 4, 2023

(54) FUEL FILTER ASSEMBLY

(71) Applicant: Hamilton Sundstrand Corporation, Charlotte, NC (US)

(72) Inventors: Marek Jedlinski, Wilczyce (PL); Marcin Korczynski, Wroclaw (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 57 days.

(21) Appl. No.: 17/239,843

(22) Filed: Apr. 26, 2021

(65) Prior Publication Data

US 2021/0332779 A1    Oct. 28, 2021

(30) Foreign Application Priority Data

Apr. 28, 2020  (PL) .......................................... 433715

(51) Int. Cl.
| | | |
|---|---|---|
| *F02M 37/34* | (2019.01) | |
| *B01D 35/147* | (2006.01) | |
| *B01D 36/00* | (2006.01) | |

(52) U.S. Cl.
CPC .......... *F02M 37/34* (2019.01); *B01D 35/1475* (2013.01); *B01D 36/008* (2013.01)

(58) Field of Classification Search
CPC ........ F02M 37/34; F02M 37/32; F02M 37/42; F02M 37/36; B01D 35/1475; B01D 36/008; B01D 2201/291; B01D 29/21; B01D 35/147; B01D 35/153
USPC ....... 210/767, 130, 136, 235, 282, 440–443, 210/455, 457, 437, 97
See application file for complete search history.

(56) References Cited

U.S. PATENT DOCUMENTS

| | | |
|---|---|---|
| 3,235,085 A | 2/1966 | Humbert, Jr. |
| 4,053,410 A | 10/1977 | Lorimor |
| 4,127,484 A | 11/1978 | Walulik et al. |
| 4,512,884 A | 4/1985 | Wheatley |

(Continued)

FOREIGN PATENT DOCUMENTS

| | | |
|---|---|---|
| DE | 10315052 A1 | 12/2003 |
| DE | 102013223352 A1 | 5/2015 |

(Continued)

OTHER PUBLICATIONS

DE10315052A1, Abstract, 1 page.

(Continued)

*Primary Examiner* — Madeline Gonzalez
(74) *Attorney, Agent, or Firm* — Cantor Colburn LLP

(57) ABSTRACT

A fuel filter includes a manifold, a connector element, a filter bowl, a filter element, a shutoff valve, an inlet port, an inlet passage, an outlet port, an outlet passage and a relief valve in which the connector element is fixed to the manifold, and the filter bowl is reversibly fixed to the connector element, the filter bowl is adapted to reversibly receive the filter element and is so configured that when the filter element is located within the filter bowl and the filter bowl attached to the connection element the filter element divides the space defined by the connector element and filter bowl into an inlet filter chamber and an outlet filter chamber, the inlet port is incorporated in the manifold, and the inlet port and inlet filter chamber are in fluid communication via the inlet passage, the outlet port is incorporated in the manifold.

13 Claims, 8 Drawing Sheets

(56) References Cited

U.S. PATENT DOCUMENTS

| | | | |
|---|---|---|---|
| 4,617,116 A | 10/1986 | Seiler | |
| 4,818,397 A | 4/1989 | Joy | |
| 4,876,857 A | 10/1989 | Feltz et al. | |
| 4,885,082 A | 12/1989 | Cantoni | |
| 5,560,824 A | 10/1996 | Sann et al. | |
| 5,881,699 A | 3/1999 | Brown et al. | |
| 6,068,762 A | 5/2000 | Stone et al. | |
| 6,068,763 A | 5/2000 | Goddard | |
| 6,555,000 B2 | 4/2003 | Knight | |
| 7,029,575 B1 | 4/2006 | Baumann et al. | |
| 7,744,758 B2 | 6/2010 | Dworatzek et al. | |
| 8,316,880 B2 | 11/2012 | Grosskopf et al. | |
| 9,180,390 B2 | 11/2015 | John | |
| 9,453,462 B2 | 9/2016 | Rickis | |
| 10,024,239 B2 | 7/2018 | Turcotte | |
| 10,357,728 B2 | 7/2019 | Ardes | |
| 2001/0004061 A1 | 6/2001 | Popoff et al. | |
| 2003/0127384 A1* | 7/2003 | Kapur .................. | B01D 35/147 210/416.5 |
| 2005/0252847 A1 | 11/2005 | Urbahn et al. | |
| 2015/0128906 A1 | 5/2015 | Futa et al. | |
| 2020/0325863 A1 | 10/2020 | Roesgen et al. | |
| 2021/0299597 A1 | 9/2021 | Jedlinski et al. | |
| 2021/0299598 A1 | 9/2021 | Jedlinski et al. | |
| 2021/0299599 A1 | 9/2021 | Jedlinski et al. | |
| 2022/0193581 A1 | 6/2022 | Jedlinski et al. | |

FOREIGN PATENT DOCUMENTS

| | | | |
|---|---|---|---|
| DE | 102018221261 A1 | 6/2020 | |
| EP | 1350551 B1 | 5/2006 | |
| EP | 3907396 A1 | 11/2021 | |
| FR | 2979387 A1 | 3/2013 | |
| IT | MI20111315 A1 | 1/2013 | |

OTHER PUBLICATIONS

Extended European Search Report for International Application No. 21163218.7 dated Sep. 23, 2021, 5 pages.
FR2979387A1, Abstract, 2 pages.
Extended European Search Report for EP Application No. 21163233.6, dated Oct. 8, 2021, pp. 1-5.
Extended European Search Report for EP Application No. 21163267.4, dated Oct. 8, 2021, pp. 1-5.
Extended European Search Report for EP Application No. 21163346.6, dated Oct. 8, 2021, pp. 1-5.
Non Final Office Action for U.S. Appl. No. 17/210,692, dated Aug. 29, 2022, 19 pages.
Non Final Office Action for U.S. Appl. No. 17/210,711, dated Aug. 29, 2022, 21 pages.
Non Final Office Action for U.S. Appl. No. 17/210,721, dated May 12, 2022, 15 pages.
Abstract for DE 102013223352 (A1), Published: May 21, 2015, 1 page.
Abstract for DE 102018221261 (A1), Published: Jun. 10, 2020, 1 page.
EP Office Action for EP Application No. 21163218.7, dated Oct. 4, 2022, pp. 1-4.
European Search Report for application EP 20461598.3, dated Mar. 26, 2021, 10 pages.
Notice of Allowance for U.S. Appl. No. 17/210,692, dated Dec. 23, 2022, 10 pages.
Notice of Allowance for U.S. Appl. No. 17/210,711, dated Dec. 21, 2022, 10 pages.
Notice of Allowance for U.S. Appl. No. 17/210,721, dated Dec. 14, 2022, 13 pages.

* cited by examiner

SECTION A-A

FUEL FILTER ASSEMBLY

FOREIGN PRIORITY

This application claims priority to Polish Application No. P.433715 filed Apr. 28, 2020, the entire contents of which is incorporated herein by reference.

TECHNICAL FIELD

This disclosure relates to fuel filters and in particular to fuel filters having a filter bypass valve and shutoff valves on the fuel inlet and outlets.

BACKGROUND

Known fuel filters comprise a filter bowl suitable for housing a filter element, a filter element, and a manifold to which the filter bowl may be reversibly attached. The manifold includes fuel inlet and outlet ports. In combination the manifold, filter bowl and the filter element define a flow path in which fuel flows into the manifold through the fuel inlet port, through the filter element and out of the manifold via the fuel outlet port.

SUMMARY

According to an aspect of this disclosure there is provided a fuel filter comprising a manifold, a connector element, a filter bowl, a filter element, a shutoff valve, an inlet port, an inlet passage, an outlet port, an outlet passage and a relief valve in which the connector element is fixed to the manifold, and the filter bowl is reversibly fixed to the connector element, the filter bowl is adapted to reversibly receive the filter element and is so configured that when the filter element is located within the filter bowl and the filter bowl attached to the connection element the filter element divides the space defined by the connector element and filter bowl into an inlet filter chamber and an outlet filter chamber, the inlet port is incorporated in the manifold, and the inlet port and inlet filter chamber are in fluid communication via the inlet passage, the outlet port is incorporated in the manifold and the outlet port and outlet filter chamber are in fluid communication via the outlet passage, the shutoff valve is biased by a biasing means into a closed configuration which prevents fuel flowing along the inlet and outlet passages when the filter bowl with a filter element located therein is not connected to the connector element, and connection of the filter bowl with a filter element located therein to the connector element causes the shutoff valve to be impelled into an open configuration which allows fuel to flow along the inlet and outlet passages, the relief valve is biased by a biasing means into a closed configuration in which fuel flowing between the inlet passage and outlet passage passes through the filter element, and movement of the relief valve into an open configuration allows fuel to flow between the inlet passage and the outlet passage without the fuel passing through the filter element, and the relief valve is caused to move into its open configuration when a predetermined fuel pressure is reached in the inlet passage.

An advantage of the fuel filter of the disclosure is that when the filter bowl with the filter channel within it is not attached to the connector element the shutoff valve is in its closed configuration with the result that fuel does not leak out of the connector element, manifold or fuel lines leading to and from the fuel inlet and fuel outlet ports respectively. This means that when servicing the fuel filter, for example changing the filter element, the fuel lines do not need to be detached from the manifold. It is further the case that when the filter bowl is being detached from the connector means the biasing means will cause the shutoff valve to automatically move into its closed configuration. As such, the removal of the filter bowl is expected to leave the person removing the filter bowl with some fuel in the filter bowl which can then be safely stored or disposed of but there will be no fuel leaking from the manifold or connector element. These advantages have the result that servicing the fuel filter can be simple and swift and as such the costs associated with such a servicing can be minimised.

A further advantage of the fuel filter of the disclosure is that the connector element can be adapted to be attached to existing known configurations of fuel filter manifolds. This has the result that a fuel filter of the current disclosure can be fitted to an existing mechanism which incorporates a fuel filter, for example a gas turbine engine for use in an aircraft, without having to change the manifold.

A further advantage of the fuel filter of the disclosure is that mechanically the fuel filter of the disclosure is relatively simple and can be made to a compact design. This can lead to a high degree of reliability and again reduced maintenance costs.

The filter bowl is configured to have the form of a bowl with an open mouth. In some embodiments of the above embodiments of the current disclosure the filter bowl is connected to the connector element via a screw thread adjacent to the open mouth of the filter bowl and a corresponding thread on the connector element. In some other embodiments the filter bowl is connected to the connector element via other mechanical engagement means where the act of connection of the filter bowl to the connector element means causes the filter bowl and the filter element therein to move closer to the connector element as connection occurs.

In some embodiments of the above embodiments the relief valve is caused to move into its open configuration when a predetermined fuel pressure is reached within the inlet passage. This is advantageous because in normal operating conditions a fuel pump will pump fuel into the fuel filter and the fuel pressure within the inlet passage and inlet chamber will, among other factors, be a function of the pumping, the pressure drop across the filter element, and the related flow rate of fuel through the filter element. As the filter element traps material in the material of the filter the pressure drop across the filter element increases and the flow rate decreases until the filter element is sufficiently blocked that there is insufficient fuel flow through the filter element. When the fuel within the inlet passage and inlet chamber reaches a predetermined pressure the pressure relief valve will be pushed open by the pressurised fuel. Fuel will then flow directly from the inlet passage to the outlet passage. This ensures that sufficient fuel exits the fuel filter via the fuel outlet port for continued operation of the mechanism in which the fuel filter of this disclosure is incorporated. Fuel will continue to flow through the relief valve until the fuel pressure within the inlet passage and inlet chamber drops below the predetermined pressure at which time the relief valve will revert to its closed configuration.

The maximum rate of flow of fuel through the fuel filter can be predetermined by designing the filter element and filter bowl to allow a maximum predetermined rate of fuel flow to occur. A non-limiting example of such a maximum desired fuel flow is 20000 pph (2.520 Kg/s).

In some embodiments of the above embodiments of the present disclosure the fuel filter further comprises a conduit element, in which the conduit element is longitudinally extending and defines an input mouth, a relief mouth, and an output mouth, in which each mouth is comprised of one or more apertures defined by a wall or walls of the conduit element, the inlet passage is in fluid communication with the input mouth of the conduit element, and the inlet filter chamber is in fluid communication with the output mouth of the conduit element, the shutoff valve comprises a valve element which comprises a first valve face and a filter element abutment face, the shutoff valve is dimensioned and configured so that in its closed configuration the first valve face overlies a first surface portion of the outer surface of the conduit element that defines the conduit element output mouth, and in its open configuration the first valve face overlies a second surface portion of the outer surface of the conduit element which is adjacent to the first surface portion, the shutoff valve is further dimensioned and configured so that the filter element abutment face abuts a portion of the filter element when the filter bowl with a filter element located therein is connected to the connection element, and abutment of the filter element abutment face and the filter element impels the shutoff valve into its open configuration.

The conduit element is in some embodiments an element separate from the manifold and the connector element, and in some embodiments integrated with the connector element. Where the conduit element is a separate element it is retained in position either between the manifold and the connector element or in the connector element by known fixing means and methods. For example, in some embodiments the conduit element can be fixed in position between the manifold and the connector element by use of a ring nut and a threaded portion on the connector element with the ring nut impelling the conduit element against a portion of the manifold.

In some embodiments of the present disclosure, the first end of the conduit element is open and defines the input mouth, the second end of the conduit element is closed, the first and second surface portions of the conduit element are portions of the side wall of the conduit element. The first surface portion is adjacent to the second end of the conduit element, the first surface portion is between the second surface portion, and the second end of the conduit element, and the longitudinal portion of the conduit element which comprises the first and second surface portions is a hollow cylinder with a closed end.

In some embodiments the conduit element is comprised of one or more coaxial hollow cylinders or tubes joined end to end if the conduit element is comprised of two or more coaxial hollow cylinders. In some embodiments where the conduit element is comprised of two or more coaxial hollow cylinders of different external diameters there are one or more shoulders on the outside face of the conduit element at the intersection of the differently dimensioned hollow cylinders. Any of the one or more shoulders can be used as a bearing surface for use in fixing the conduit element in position. In some embodiments the conduit element is held in position using a ring nut, in some embodiments the ring nut is tightened against the bearing surface formed by a shoulder on the outside face of the conduit.

In embodiments of the above embodiments in which at least the first and second surface portions of the conduit element are cylindrical, the valve element of the shutoff valve defines a cylindrical void passing through the valve element, and the first valve face that overlies the first or second surface portions of the conduit element is the cylindrical face defining that void. In these embodiments the dimensions of the void in the valve element closely matches the dimensions of the first and second surface portions of the conduit element. In some embodiments there are one or more seal means associated with the first surface portion of the conduit element and the first valve face to minimise the likelihood of fuel leakage from the inlet passage via the output mouth when the first valve face overlies the output mouth of the conduit element. The shutoff valve is in its closed configuration when the first valve face overlies the first surface portion of the conduit element, and in its open configuration when the first valve face overlies the second surface portion of the conduit element.

In some embodiments of the above embodiments, the valve element further comprises a second valve face. The second valve face prevents the flow of fuel along the outlet passage when the shutoff valve is in its closed configuration and permits the flow of fuel along the outlet passage when the shutoff valve is in its open configuration.

In some embodiments the outlet passage comprises a plate and one or more plate passages extending through that plate. The plate extends across the outlet passage and would prevent the flow of fuel along the outlet passage if the plate passage or passages were absent. In these embodiments the second valve face is dimensioned and configured to overlie a mouth of each plate passage when the shutoff valve is in its closed configuration, and to be distanced from each plate passage when the shutoff valve is in its open configuration. In some embodiments there are one or more seal means associated with one or more of the second valve face, the plate, and/or the mouth or mouths of the plate passages to minimise the likelihood of fuel leakage from the outlet passage when the shutoff valve is in its closed configuration.

In some embodiments of the above embodiments, the outlet passage comprises a plate and one or more plate passages, the plate is attached to at least one wall of the outlet passage, and has at least one free edge which is not attached to a wall of the outlet passage, at least one plate passage is defined by at least one free edge of the plate and a portion of at least one wall of the outlet passage, the plate extends across part of the outlet passage and each plate passage permits fuel flow along the outlet passage, the second valve face is dimensioned and configured to overlie a mouth of each plate passage when the shutoff valve is in its closed configuration, and the second valve face is spaced from a mouth of each plate passage when the shutoff valve is in its open configuration.

In some embodiments of the above embodiments, the outlet passage comprises a plate and one or more plate passages, each plate passage extends through the plate, the plate extends across at least part of the outlet passage, the plate passages permit fuel flow along the outlet passage, the second valve face is dimensioned and configured to overlie a mouth of each plate passage when the shutoff valve is in its closed configuration, and the second valve face is spaced from a mouth of each plate passage when the shutoff valve is in its open configuration.

Thus, when the relief valve is in its open position the inlet passage is in fluid communication with the outlet passage via the relief mouth of the conduit element, the relief chamber, and the relief passage or passages. This will allow sufficient fuel to reach the engine even if the fuel filter is sufficiently blocked for there to be insufficient fuel flow through that filter for proper function of the engine.

In some embodiments of the above embodiments, the relief chamber is defined by at least one side wall, and first and second end walls. Each side wall is parallel to the side wall at the opposite side of the relief chamber and each relief passage opens into the relief chamber through one or more of the side walls.

The relief valve body comprises a pressure face, at least one relief valve face and a biasing face. The pressure face extends between the or each side wall of the relief chamber and faces towards the first end wall of the chamber, each relief valve face is in sliding contact with a side wall of the relief chamber, and the biasing face extends between each side wall of the relief chamber and faces towards the second end wall of the relief chamber. The biasing means extends between the second end wall of the relief chamber and the biasing face of the relief valve body.

The relief mouth of the conduit element at least partially opens into the portion of the relief chamber between the first end wall of the relief chamber and the pressure face of the relief valve body or through the first end wall of the relief chamber. In these embodiments at least a portion of the outer face of the conduit element forms at least a part of a wall defining the relief chamber.

In some embodiments of the above embodiments, each relief valve face is of a sufficient dimension in the direction that the biasing means exerts its bias that the mouths of the or each relief passage can be closed or sealed by the relief valve face. The relief valve body is, in some embodiments a hollow cylinder with one closed end and an open end. In other embodiments it is a hollow shape with one open and one closed end that extends between each side wall of the relief chamber and extends in the direction parallel to the each side wall for a part of the distance between the first and second end walls. The open end faces towards the second end wall of the relief chamber and the biasing means bears on the face of the closed end facing the second end wall of the relief chamber. This configuration provides sufficient dimensions for the relief valve face and minimises the weight of the valve element.

In some embodiments of the above embodiments, the relief valve body is biased to a positon where the pressure face of the relief valve body is a predetermined distance from the first end wall of the relief chamber. When the relief valve body is at that predetermined position the relief mouth of the conduit element at least partially opens into the portion of the relief chamber between the first end wall of the relief chamber and the pressure face of the relief valve body. In some embodiments, the relief mouth is partially closed by at least one relief valve face of the relief valve body. In such embodiments the proportion of the relief mouth of the conduit element that is not closed by the relief valve face does not have to be large because when the relief valve is in its closed configuration there is no fuel flow into the relief chamber and the fuel pressure does not require a large aperture for the fuel pressure to equalise between the inlet passage and the relief chamber.

If the fuel pressure in the relief chamber reaches the level that is required for the fuel pressure to overcome the bias of the relief valve biasing means, the relief valve element is impelled away from the first end wall of the relief chamber and the proportion of the relief mouth and the mouth of each relief passage that is not closed by the relief valve face increases. As those proportions increase the possible rate of flow of fuel through the relief mouth and each relief passage also increases.

In some embodiments of the above embodiments, the relief valve body is biased against a stop means. The stop means is so located that the relief valve body is at the predetermined position when biased against the stop means.

In some embodiments of the above embodiments, at least one of the biasing means acting on the shutoff valve and the relief valve is a compression spring.

According to a second aspect of the present disclosure there is provided a gas turbine engine comprising a fuel tank, at least one fuel supply line, at least one fuel filter and a combustor in which the or each fuel filter is a fuel filter according to the first aspect of the present disclosure.

According to a third aspect of the present disclosure there is provided an aircraft comprising at least one engine, a fuel tank, at least one fuel supply line, and at least one fuel filter in which at least one fuel filter is a fuel filter according to the first aspect of the present disclosure.

According to a fourth aspect of the present disclosure there is provided a method of supplying fuel to a combustor of a gas turbine engine comprising passing the fuel through a fuel filter according to the first aspect of the present disclosure prior to introduction of some or all of the fuel into the combustor.

In some embodiments of the above embodiments the relief valve of the fuel filter of the present disclosure is formed from stainless steel 4403, the or each biasing means from spring steel, the or each seal element from a suitable fluorocarbon, and the remaining parts from aluminium 6061 or aluminium T651. In other embodiments, other suitable materials may be used to form the parts of the fuel filter.

BRIEF DESCRIPTION OF THE DRAWINGS

The present invention will be further described and explained by way of example with reference to the accompanying drawings in which.

DETAILED DESCRIPTION

Figure 1:
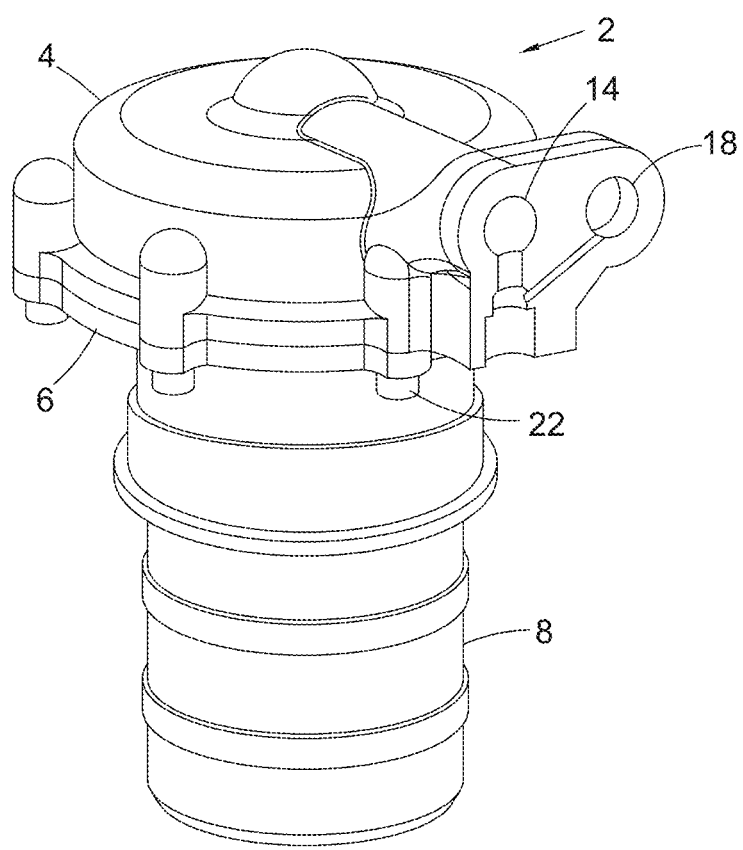
FIG. 1 shows a perspective view of an embodiment of a fuel filter of the present disclosure.
Figure 2:
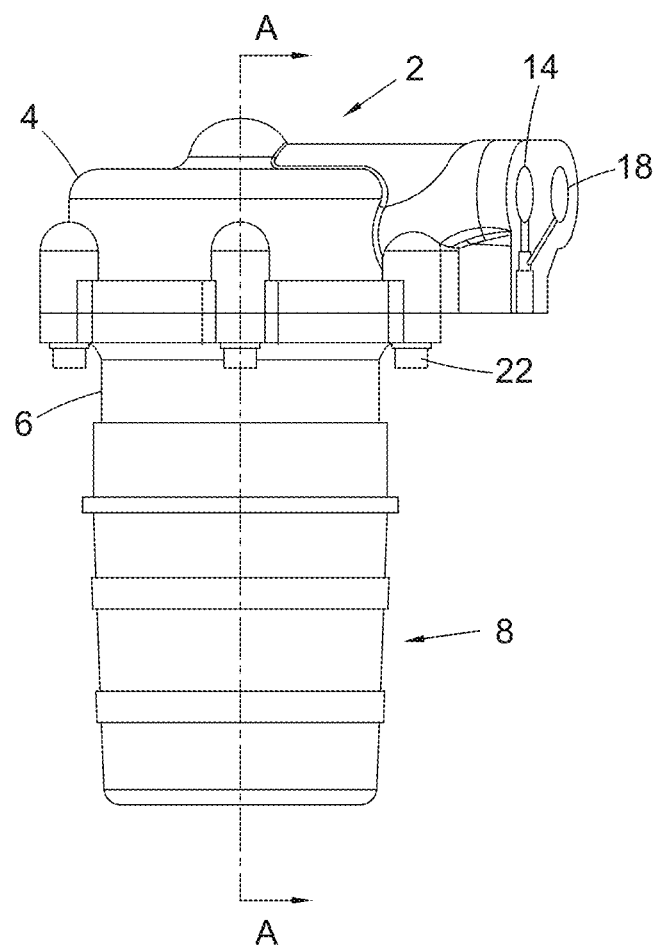
FIG. 2 shows a first side view of the fuel filter of FIG. 1.
Figure 3:
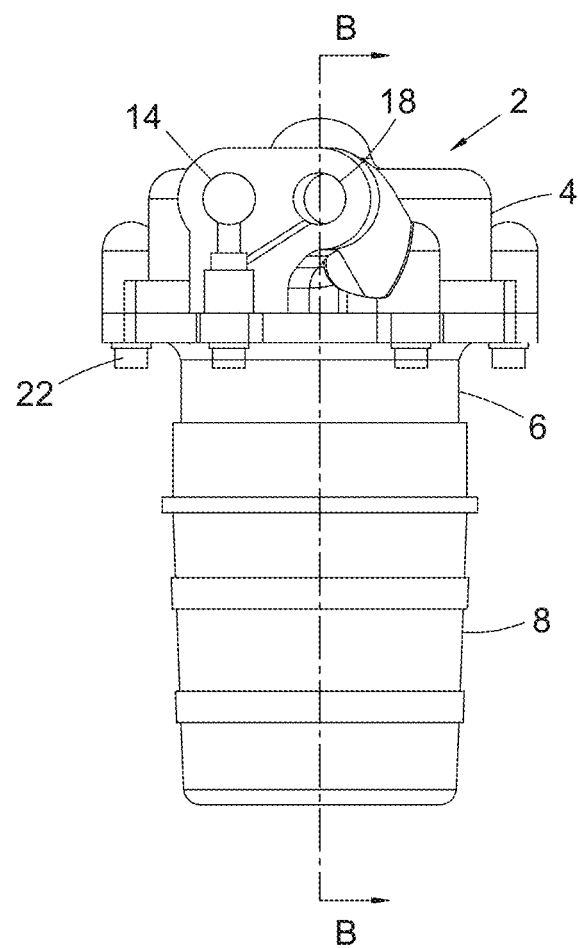
FIG. 3 shows a second side view of the fuel filter of FIG. 1.

With reference to FIGS. 1, 2 and 3, a fuel filter 2 is comprised of a manifold 4, to which is attach a connector element 6. Reversibly connected to the connector element 6 is a filter bowl 8.

The manifold 4 defines a fuel inlet port 14 and a fuel outlet port 18. The fuel inlet and outlet ports 14, 18 are provided with means (not shown) to engage with the ends of a fuel input line (not shown) and a fuel output line (not shown) respectively.

With reference to FIGS. 4 to 9, for clarity of the figures some parts illustrated in the Figures are labelled only in some of the Figures.

Figure 4:
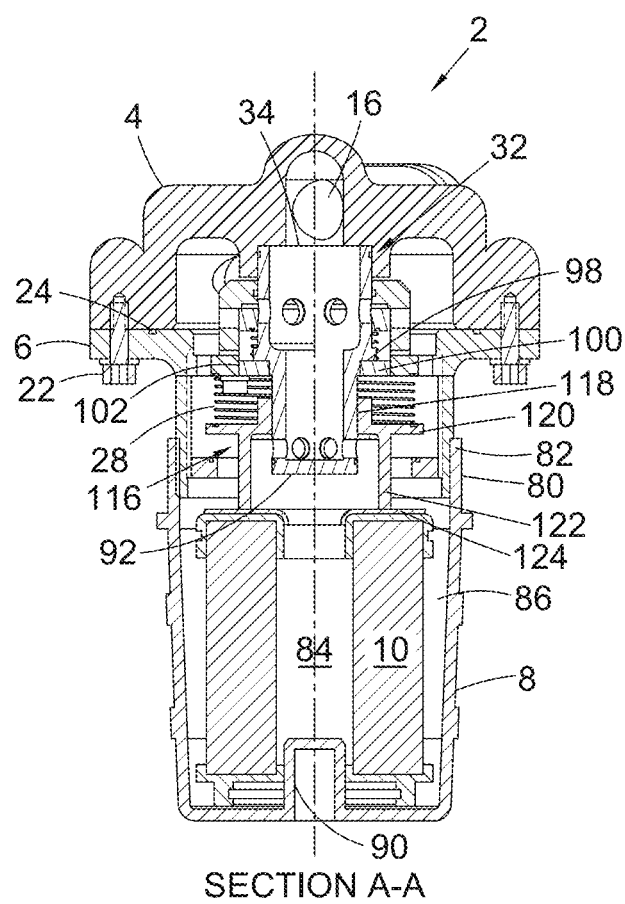
FIG. 4 shows a section A-A of the fuel filter of FIG. 2.
Figure 5:
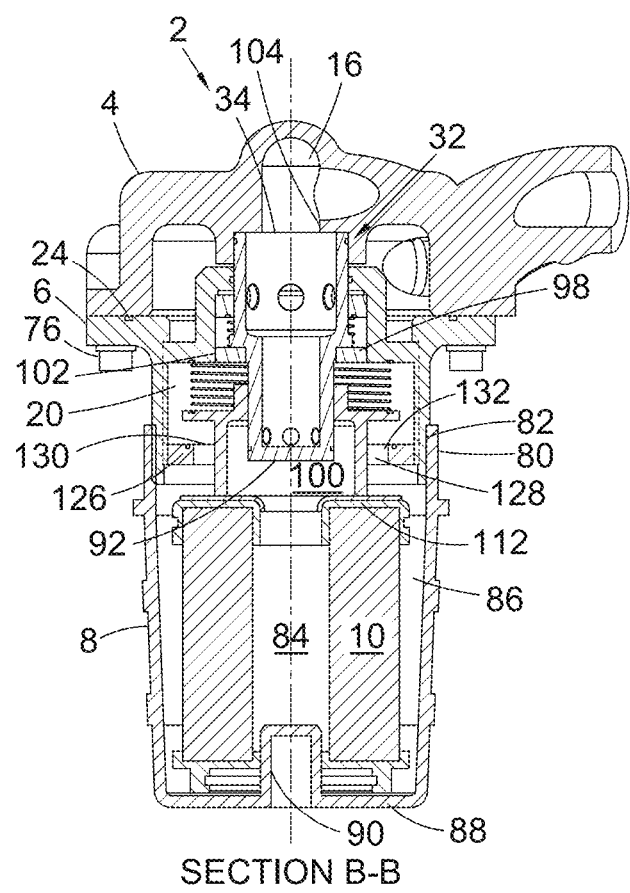
FIG. 5 shows a section B-B of the fuel filter of FIG. 3.
Figure 6:
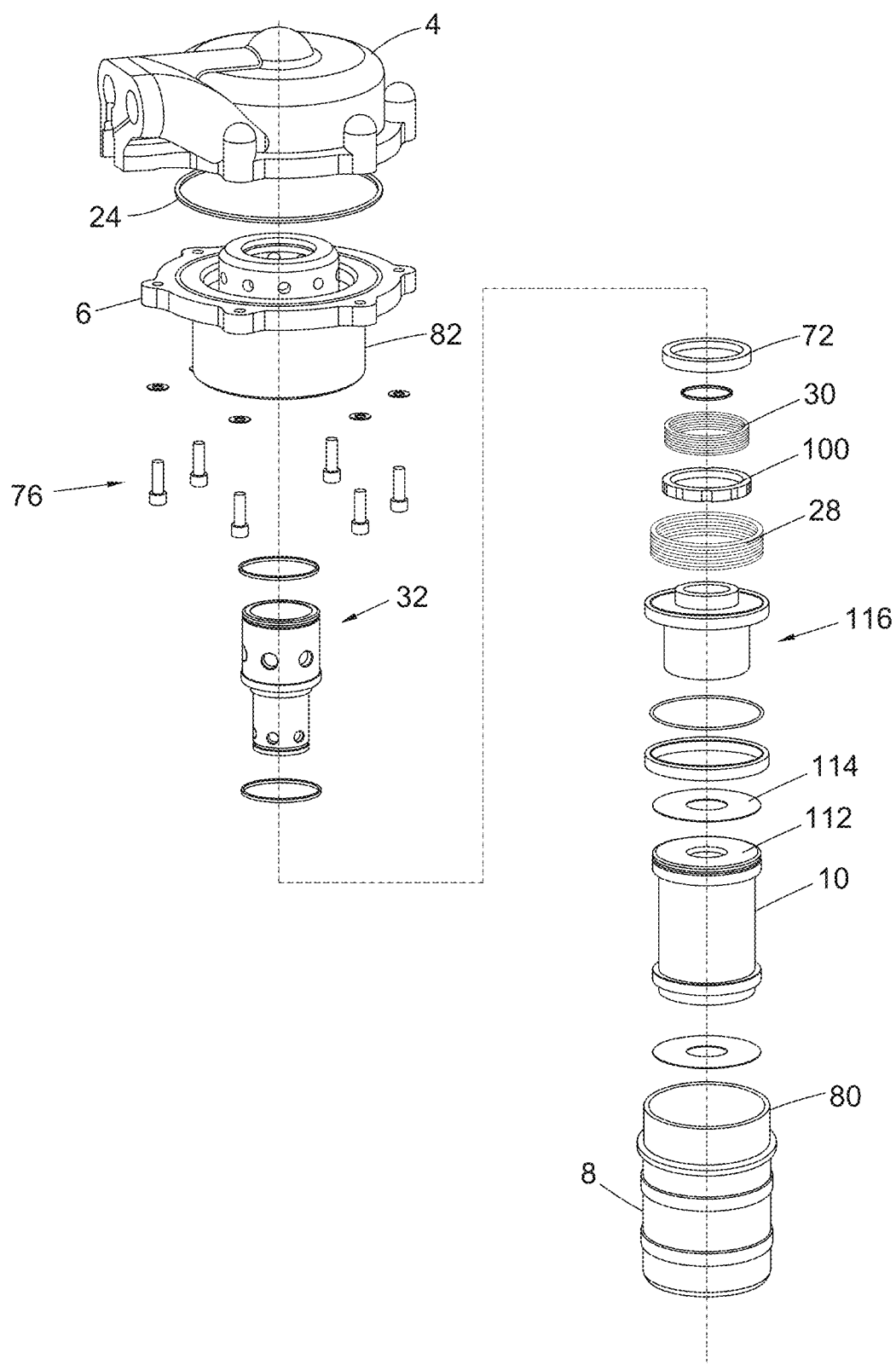
FIG. 6 shows an exploded view of the components of the fuel filter of FIG. 1.

With reference to FIGS. 4, 5 and 6, the connector element 6 is attached to the manifold 4 by a number of bolts 22 with an annular o-ring 24 between the abutting faces of the connector element 6 and manifold 4. The o-ring 24 is formed of a fluorocarbon that is suitable for high temperatures and which has good chemical resistance, for example Viton (Registered trade mark) GLT which is available from DuPont Performance Elastomers. This is also the material used in connection with other annular seals, in particular o-rings, and other seal means employed in this and some other embodiments of a fuel filter according to the present disclosure.

The filter bowl 8 is adapted to reversibly engage with the connection means 6 via a helical screw thread (not shown) which is formed on the radially inner face of the portion 80 of the filter bowl 8, and the radially outer face of the portion 82 of the connector element 6.

The filter bowl 8 is configured and dimensioned to substantially surround a known filter element 10. The filter element 10 has the form of a hollow cylinder and is constructed to filter fuel that is flowing radially outwardly from an inlet filter chamber 84 inside of the filter element 10 to an outlet filter chamber 86 outside the filter element 10.

The base 88 of the filter bowl 8 is configured to engage with a first end of the filter element 10. The engagement is a push fit of the filter element 10 onto a spindle 90. The push fit is sufficiently tight that fuel will not flow through the joint between the filter element 10 and the spindle 90. The push fit holds the filter element 10 in position within the filter bowl 8 when the filter bowl 8 is being connected to and disconnected from the connector element 6.

The manifold 4 defines an inlet passage 16 which extends from the fuel inlet port 14 to a mouth 104 on a face of a part of the manifold 4 that faces toward the filter bowl 8 when it is connected to the connector element 6.

Figure 7:
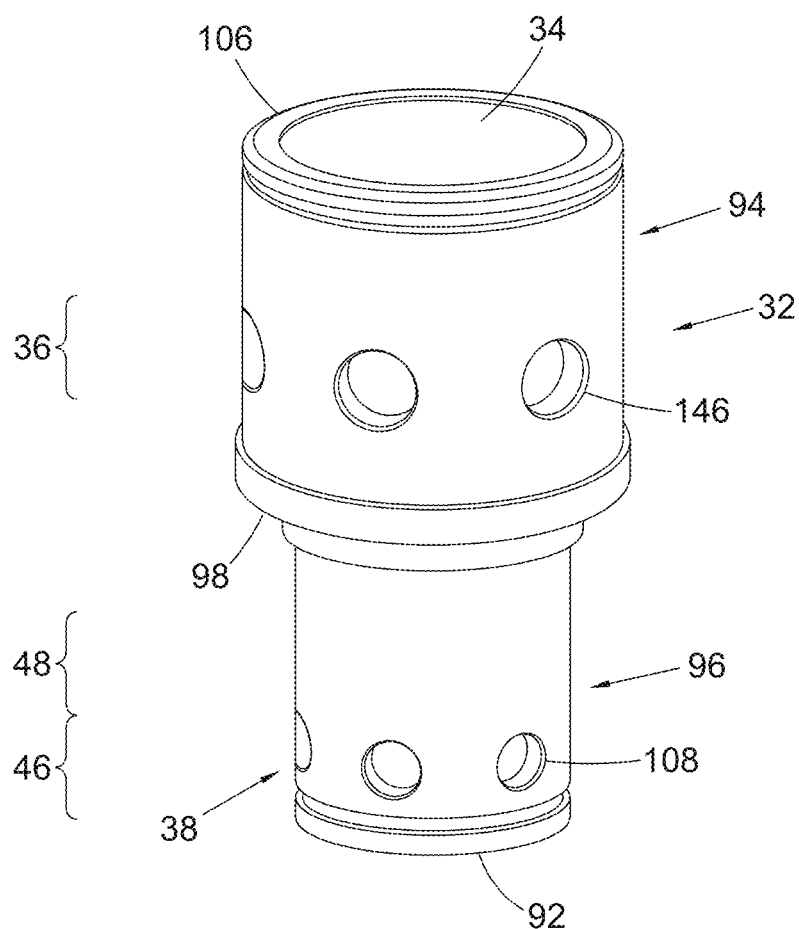
FIG. 7 shows an enlarged view of the conduit element of the fuel filter of FIG. 1.

With reference to FIG. 7 and with continued reference to FIGS. 4, 5 and 6, the conduit element 32 is has a first end 106 which defines the input mouth 34, a closed end 92, and is comprised of first and second tube elements 94, 96 between the first and second ends 106, 92. The first tube element 94 includes first end 106 and has a larger external diameter than the second tube element 96. The second tube element 96 includes the second conduit end 92 and is joined to the first tube element 94 at its other end. Each tube element 94, 96 has approximately the same wall thickness. The joint between the first and second tube elements 94, 96 is a step joint forming a shoulder and a bearing face 98.

The conduit element is held in position relative to the manifold 4 by a ring nut 100 so that the input mouth 34 of the conduit element overlies the mouth 104 of the inlet passage 16 with the result that the inside of the conduit element 32 is in fluid communication with the inlet passage 16. The ring nut 100 has an external thread (not shown) which engages with an internal thread 148 on a face of a second portion 102 of the connector element 6. Tightening of the ring nut 100 causes the nut to bear upon bearing face 98 of the conduit element 32 and impels the first end 106 of the conduit element 32 against the manifold 4. The joint between the first end 106 and the manifold 4 may include a seal means (not shown) to prevent fuel leaking out of the inlet passage 16 or conduit element 32 via that joint.

Adjacent to the closed end 92 of the conduit element 32 is the output mouth 38 in the form of a number of apertures 108 (only one of which is labelled for clarity). The apertures extend through the tube 96 of the conduit element 32 and open into a void 110. The void 110 is in fluid communication with the inlet filter chamber 84.

The void 110 is defined by a part of the conduit element 32, a part of the shutoff valve 12 and a part of the second end 112 of the filter element 10. The second end 112 of the filter element 10 is an end cap to the portion of the filter element 10 that is comprised of a filter material and is overlaid by a layer of suitable sealing material 114.

Figure 8:
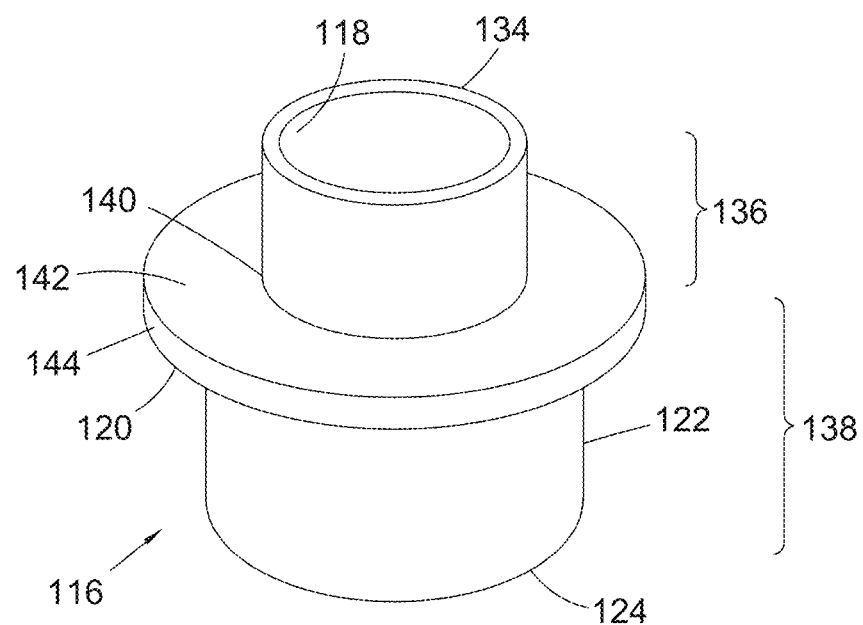
FIG. 8 shows a schematic view of a part of the shutoff valve of the fuel filter of FIG. 1.

With reference to FIG. 8 and with continued reference to FIGS. 4, 5, 6 and 7, the shut off valve 12 comprises a valve element 116, first and second surface portions 46, 48 of the conduit element 32, and a biasing means 28.

The valve element 116 comprises a first valve face 118, a second valve face 120, a valve spacer 122 and a filter element abutment face 124. The valve spacer 122 of the valve element 116 is longitudinally extending with first and second spacer ends 134, 124.

A first portion 136 of the valve spacer 122 extends longitudinally from the first spacer end 134 to an intermediate position 140 and the first portion 136 has the first valve face 118 as one of its faces. The first valve face 118 defines a cylindrical void with a first internal diameter sufficiently similar to the external diameter of the tube element 96 of the conduit element 32 for the first valve face to be a sliding fit over the outer surface of the tube element 96 of the conduit element 32.

A second portion 138 of the valve spacer 122 extends between the intermediate position 140 and the second spacer end 124 and has a second internal diameter. The second internal diameter is larger than the first internal diameter of the first valve face 118. The second spacer end of the valve spacer 122 is the filter end abutment face 124.

The length of the valve spacer 122 is such that when the filter bowl 8 with a filter element 10 mounted within the filter bowl 8 is fully connected to the connector element 6, the filter end abutment face 124 abuts the sealing material 114 on the second end 112 of the filter element 10, and the first valve face 118 overlies the second surface portion 48 of the conduit element 32.

The biasing means 28 impels the valve element 116 towards the filter element 10 and as a result the filter end abutment face 124, the sealing material 114, and the second end 112 of the filter element 10 form a fuel tight joint. This has the result that while the relief valve is in its closed configuration fuel pumped into the inlet passage 16 via the inlet port 14 passes along that passage, along the conduit element 32 and out of that element via the apertures 108, into the void 110 and then into the inlet filter chamber 84. The fuel then passes through the filter portion of the filter element 10 and into the outlet filter chamber 86.

The outlet filter chamber 86 is defined by the radially outer face of the filter element 10, a portion of the inner face of the filter bowl 8, a part of the radially outer face of the valve spacer 122, a portion of the inner face of the connector element 6, and a face of an outlet passage plate 126. The portion of the inner face of the connector element 6, and the face of an outlet passage plate 126 also form walls to outlet passage 120.

The outlet passage plate 126 extends across at least part of the interface of the outlet passage 20 with the outlet filter chamber 86. The outlet passage plate 126 extends in the direction of the radially outer face of the valve spacer 122 from a first edge that is fixed to or integral with a portion of the connector element 6 towards a second edge 132 of the plate 126. The second edge 132 of the plate 126 is not attached to any wall and is spaced from the radially outer face of the valve spacer 122. The gap between that edge 132 and the face of the valve spacer 122 is the passage 128.

Once fuel in the outlet filter chamber 86 has passed through the passage 128 into the outlet passage 20 it flows along the outlet passage until it leaves the fuel filter 2 via the outlet port 18.

The portion of the valve element 116 which defines the second valve face 120 of the valve element 116 is a flange 142. The flange 142 extends into the outlet passage 20 downstream of the outlet passage plate 126 and passage 128.

The second valve face 120 is the face of the flange 142 that faces toward the passage 128.

The flange 142 is so dimensioned and positioned on the valve element 116 that when the shutoff valve 12 is in its closed position at least the outer edge 144 of the flange 142 and/or a portion of the second valve face 120 overlies and is contact with a part of the downstream face of the outlet passage plate 126. That contact is a fuel tight contact and may be assisted by the use of one or more seal means (not shown).

Figure 9:
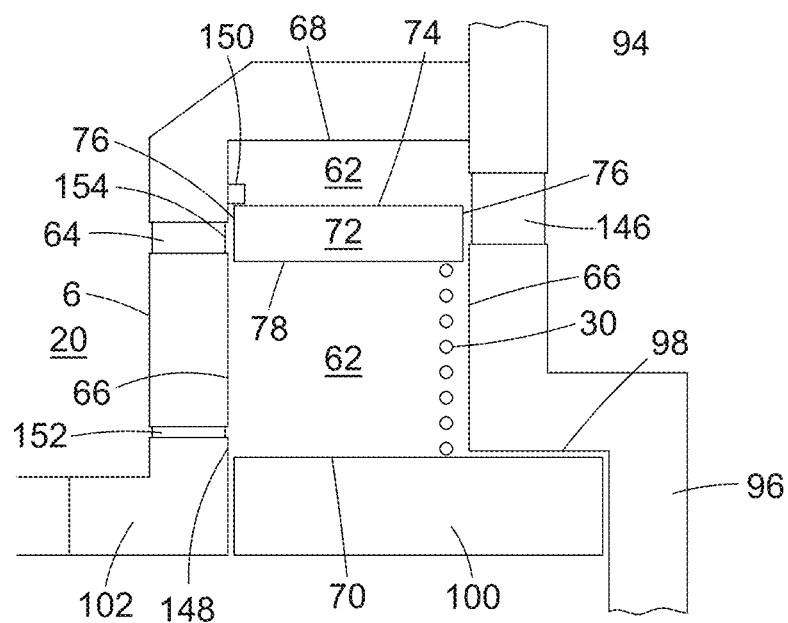
FIG. 9 shows a schematic view of a part of the relief valve of the fuel filter of FIG. 1.

With reference to FIG. 9 and with continued reference to FIGS. 4, 5, 6 and 7, the tube portion 94 of the conduit element 32 includes the relief mouth 36. The relief mouth 36 is a number of apertures 146 (only one labelled for clarity) which pass through the tube portion 94 and partially open into the relief chamber 62.

The relief chamber 62 is defined by side walls 66, a first end wall 68 and a second end wall 70. One of the side walls 66 is the outer face of a portion of the tube 94 of the conduit element 32. The side wall 66 on the opposite side of the relief chamber includes a number of relief passages 64 which open at one end into the relief chamber 62 through a mouth 154 and at the other end into the outlet passage 20. Within the relief chamber 62 is located a relief valve body 72. That body 72 has a pressure face 74 facing toward the relief chamber first end wall 68, a biasing face 78 facing toward the relief chamber second end wall 70, and as many relief valve faces 76 as there are relief chamber side walls 66. Each relief valve face 76 is in sliding contact with a relief chamber side wall 66.

The relief valve body 72 is biased by biasing means 30 against a stop 150. The stop 150 is located in such a position that when the relief valve body 72 is biased against it, each mouth 154 is closed by a relief valve face 76.

When the valve body 72 is biased against the stop 150 each of the apertures 146 in the tube 94 of the conduit element 32 are partially closed by a relief valve face 76. The portion of the apertures 146 that is not closed by a relief valve face 76 opens into the portion of the relief chamber 62 between the pressure face 74 of relief valve body 72 and the first end wall 68 of the relief chamber. As a result, fuel filling that portion of the relief chamber 62 is in communication with fuel in the inlet passage 16 and at the same pressure as that fuel.

The portion of the relief chamber 62 between the biasing face 78 and the second end wall 70 of the relief chamber is, when the fuel filter 2 is in use, full of fuel which is in communication with fuel in the outlet passage 20 via a passage 152 extending between the part of the relief chamber 62 between the biasing face 78 and the second end wall 70 and the outlet passage 20. This has the result that fuel in that part of the relief chamber is at the same pressure as fuel in the outlet passage, and that movement of the relief valve body 72 towards the second end wall 70 displaces fuel from the part of the relief chamber 62 between the biasing face 78 and the second end wall 70 into the outlet passage 20.

If the filter element 10 becomes blocked and as a result ceases to allow the passage of sufficient fuel from the filter inlet chamber 84 to the fuel outlet chamber 86 the pumping of fuel into the fuel filter 2 by a fuel pump in the normal operation of an engine will result in an increase in the pressure of the fuel in the inlet passage 16 and hence in the part of the relief chamber 62 between the pressure face 74 and the first end wall 68. Once sufficient pressure has built up in that part of the relief chamber 62, the bias of the biasing means 30 will be overcome and the relief valve body 72 impelled towards the second end wall 70. This will increase the proportion of the apertures 146 that are not closed by a relief valve face 76 and open each mouth 154 allowing the flow of fuel from the inlet passage 16 through the relief chamber 64 and into the outlet passage 20.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the fuel filters disclosed in the various embodiments may be used alone, in combination, or in a variety of arrangements not specifically discussed in the embodiments described in the foregoing and this disclosure is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A fuel filter comprising:
   a manifold;
   a connector element; a filter bowl;
   a filter element;
   a shutoff valve;
   an inlet port; an inlet passage;
   an outlet port;
   an outlet passage; and
   a relief valve;
   wherein the connector element is fixed to the manifold, and the filter bowl is reversibly fixed to the connector element;
   wherein the filter bowl is adapted to reversibly receive the filter element and is so configured that when the filter element is located within the filter bowl and the filter is bowl attached to the connector element the filter element divides a space defined by the connector element and filter bowl into an inlet filter chamber and an outlet filter chamber;
   wherein the inlet port is incorporated in the manifold, and the inlet port and inlet filter chamber are in fluid communication via the inlet passage;
   wherein the outlet port is incorporated in the manifold and the outlet port and outlet filter chamber are in fluid communication via the outlet passage;
   wherein the shutoff valve is located between the inlet and outlet passages and is biased by a biasing means into a closed configuration which prevents fuel flowing along the inlet and outlet passages when the filter bowl with the filter element located therein is not connected to the connector element;
   wherein connection of the filter bowl with the filter element located therein to the connector element causes the shutoff valve to be impelled into an open configuration which allows fuel to flow along the inlet and outlet passages;
   wherein the relief valve is located between the inlet and outlet passages and is biased by a biasing means into a closed configuration in which fuel flowing between the inlet passage and outlet passage passes through the filter element, and movement of the relief valve into an open configuration allows fuel to flow between the inlet passage and the outlet passage without the fuel passing through the filter element;

wherein the relief valve is caused to move into its open configuration when a predetermined fuel pressure is reached in the inlet passage; and wherein the fuel filter further comprises a conduit element, in which the conduit element is longitudinally extending and defines an input mouth, a relief mouth, and an output mouth, in which each mouth is comprised of one or more apertures defined by a wall or walls of the conduit element;

the inlet passage is in fluid communication with the input mouth of the conduit element, and the inlet filter chamber is in fluid communication with the output mouth of the conduit element;

the shutoff valve comprises a valve element which comprises a first valve face and a filter element abutment face;

the shutoff valve is dimensioned and configured so that in its closed configuration the first valve face overlies a first surface portion of an outer surface of the conduit element that defines the conduit element output mouth, and in its open configuration the first valve face overlies a second surface portion of the outer surface of the conduit element which is adjacent to the first surface portion;

the shutoff valve is further dimensioned and configured so that the filter element abutment face abuts a portion of the filter element when the filter bowl with the filter element located therein is connected to the connector element; and abutment of the filter element abutment face and the filter element impels the shutoff valve into its open configuration.

2. A fuel filter according to claim 1, wherein:
a first end of the conduit element is open and defines the input mouth,
a second end of the conduit element is closed;
the first and second surface portions of the conduit element are portions of a side wall of the conduit element;
the first surface portion is adjacent to the second end of the conduit element;
the first surface portion is between the second surface portion and the second end of the conduit element; and
a longitudinal portion of the conduit element which comprises the first and second surface portions is a hollow cylinder with a closed end.

3. A fuel filter according to claim 2, wherein the conduit element is comprised of one or more coaxial hollow cylinders joined end to end if the conduit element is comprised of two or more coaxial hollow cylinders.

4. A fuel filter according to claim 2, wherein the valve element defines a cylindrical void passing through the valve element and the first valve face is a cylindrical face defining that void.

5. A fuel filter according to claim 1, wherein:
the valve element further comprises a second valve face;
the second valve face prevents the flow of fuel along the outlet passage when the shutoff valve is in its closed configuration, and permits the flow of fuel along the outlet passage when the shutoff valve is in its open configuration.

6. A fuel filter according to claim 5, wherein the outlet passage comprises a plate and one or more plate passages,
the plate is attached to at least one wall of the outlet passage, and has at least one free edge which is not attached to a wall of the outlet passage,
at least one plate passage is defined by at least one free edge of the plate and a portion of at least one wall of the outlet passage,
the plate extends across part of the outlet passage and each plate passage permits fuel flow along the outlet passage,
the second valve face is dimensioned and configured to overlie a mouth of each plate passage when the shutoff valve is in its closed configuration, and
the second valve face is spaced from a mouth of each plate passage when the shutoff valve is in its open configuration.

7. A fuel filter according to claim 5, wherein the outlet passage comprises a plate and one or more plate passages,
each plate passage extends through the plate,
the plate extends across at least part of the outlet passage,
the plate passages permit fuel flow along the outlet passage,
the second valve face is dimensioned and configured to overlie a mouth of each plate passage when the shutoff valve is in its closed configuration, and
the second valve face is spaced from a mouth of each plate passage when the shutoff valve is in its open configuration.

8. A fuel filter according to claim 1, further comprising a relief chamber, wherein:
at least one relief passage opens into the relief chamber through at least one wall of the relief chamber,
the relief chamber is in fluid communication with the outlet passage via each relief passage,
the relief mouth of the conduit element opens into the relief chamber,
the relief valve is comprised of a biasing means and a relief valve body,
the relief valve body is located within the relief chamber and may move between a closed configuration in which it sealingly overlies the mouths of each relief passage, and an open configuration in which the mouths of each relief passage are open and fuel may flow through each mouth.

9. A fuel filter according to claim 8, wherein:
the relief chamber is defined by at least one side wall, and first and second end walls,
each side wall is parallel to the side wall at the opposite side of the relief chamber,
each relief passage opens into the relief chamber through one or more of the side walls,
the relief valve body comprises a pressure face, at least one relief valve face and a biasing face,
the pressure face extends between each side wall of the relief chamber and faces towards the first end wall of the relief chamber,
each relief valve face is in sliding contact with a side wall of the relief chamber,
the biasing face extends between each side wall of the relief chamber and faces towards the second end wall of the relief chamber,
the biasing means extends between the second end wall of the relief chamber and the biasing face of the relief valve body, and the relief mouth of the conduit element at least partially opens into the portion of the relief chamber between the first end wall of the relief chamber and the pressure face of the relief valve body.

10. A fuel filter according to claim 9, wherein:
the relief valve body is biased to a position where the pressure face of the relief valve body is a predetermined distance from the first end wall of the relief chamber,
the relief mouth of the conduit element partially opens into a portion of the relief chamber between the first end wall of the relief chamber and the pressure face of the relief valve body, and
the relief mouth of the conduit element is partially closed by at least one relief valve face of the relief valve body.

11. A fuel filter according to claim 10, wherein the relief valve body is biased against a stop means.

12. A fuel filter according to claim 1, wherein at least one of the biasing means is a compression spring.

13. A method of supplying fuel to a combustor of a gas turbine engine comprising:
passing the fuel through the fuel filter according to claim 1 prior to introduction of the fuel into the combustor.

\* \* \* \* \*